United States Patent
Chen et al.

(10) Patent No.: US 8,417,470 B2
(45) Date of Patent: Apr. 9, 2013

(54) SAFETY PULSER FOR FUEL DISPENSER AND METHOD FOR JUDGING FRAUD ACTIVITY

(75) Inventors: Jianhua Chen, Beijing (CN); Fengshi Li, Beijing (CN); Yana Zhu, Beijing (CN)

(73) Assignee: Beijing Tocel Electronics Co., Ltd., Beijing (CN)

( * ) Notice: Subject to any disclaimer, the term of this patent is extended or adjusted under 35 U.S.C. 154(b) by 0 days.

(21) Appl. No.: 12/808,269

(22) PCT Filed: May 9, 2008

(86) PCT No.: PCT/CN2008/000924
§ 371 (c)(1), (2), (4) Date: Jun. 15, 2010

(87) PCT Pub. No.: WO2009/086715
PCT Pub. Date: Jul. 16, 2009

(65) Prior Publication Data
US 2010/0262385 A1    Oct. 14, 2010

(30) Foreign Application Priority Data
Jan. 8, 2008    (CN) .......................... 2008 1 0055742

(51) Int. Cl.
G01F 1/00    (2006.01)
(52) U.S. Cl.
USPC .......................................................... 702/46
(58) Field of Classification Search ................... 702/46; 73/243
See application file for complete search history.

(56) References Cited

U.S. PATENT DOCUMENTS

| | | | | |
|---|---|---|---|---|
| 4,356,727 | A | * | 11/1982 | Brown et al. ................... 73/243 |
| 4,410,949 | A | | 10/1983 | Huellinghorst et al. |
| 6,421,616 | B1 | | 7/2002 | Dickson |

FOREIGN PATENT DOCUMENTS

| | | | |
|---|---|---|---|
| CN | 2773823 | | 4/2006 |
| CN | 2773823 Y | * | 4/2006 |
| JP | 649200 | | 1/1989 |

OTHER PUBLICATIONS

International Search Report of PCT/CN2008/000924 dated Oct. 23, 2008.

* cited by examiner

*Primary Examiner* — Jonathan C Teixeira Moffat
*Assistant Examiner* — Xiuquin Sun
(74) *Attorney, Agent, or Firm* — Rankin, Hill & Clark LLP (57) ABSTRACT

A security pulse generator and methods thereof are applied in fuel dispensers. The fuel dispenser includes a flow measuring transducer and a control main board on which there is a measuring microprocessor on the control main board. The security pulse generator includes: a pulse signal generating component, which generates a corresponding pulse signal according to the rotation of the flow measuring transducer; an encoding microprocessor, which receives and transduces the pulse signal, transmits it to the control main board, and meanwhile encodes the output pulse signal; a measuring microprocessor, which receives and decodes output pulse number encoded data from the encoding microprocessor and transforms it to the output pulse number after decoding it, then compares it to the pulse number of the control main board to determine if there is suspecting frauds in the fueling process.

14 Claims, 5 Drawing Sheets

SAFETY PULSER FOR FUEL DISPENSER AND METHOD FOR JUDGING FRAUD ACTIVITY

TECHNICAL FIELD

This invention relates to an anti-fraud device and method, in particular, which is related to a security pulse generator for the fuel dispensers applied in fuel dispensers against frauds and methods to determine frauds by the security pulse generator for fuel dispensers.

BACKGROUND

The measurement accuracy of a fuel dispenser is critical as a measuring instrument. In the practice of some fuel dispensers, the measurement accuracy does not meet the requirements for the artificial or non-human actions of stealing oil and oil leakage.

The artificial behaviors of stealing oil and oil leakage are fraudulent activities. The means of the fraud practices mainly are there in the common cases as the following:
(1) Modify the measuring software to fraud, such as changing the pulse equivalent of measuring software,
(2) Fraud in pulse signal transmission channels, such as inserting pulse signals in them.
(3) Fraud in pulse signal sources: sending more pulse signals, such as actually generating 100 pulses, but the intelligent component issues 110 pulses. For the non-human activities of stealing oil and oil leakage, there are kinds of following cases very often:
(1) Fuel dispenser component failures, such as the electromagnetic valve failure;
(2) Interfering signals occur in the pulse transmission process of the fuel dispensers,
(2) Fuel dispenser cable connection is not correct, that is generally caused by maintenances.

In view of these defects, and no effective ways to prevent these acts, this inventor finally got to invent a security pulse generator for fuel dispensers and its anti-fraud methods after a long time of researches and practices,

SUMMARY OF THE INVENTION

The purpose of this invention is to provide a security pulse generator for fuel dispensers and anti-Fraud methods to overcome these deficiencies above.

To achieve the above purpose, the technical schemes of this invention consists of: firstly offering a security pulse generator applied to a fuel dispenser, wherein the fuel dispenser comprises a flow measuring transducer and a control main board on which there is a measuring microprocessor, said security pulse generator for fuel dispensers comprising:

A pulse signal generating component, which is applied to generate pulse signals according to said flow measuring transducer.

An encoding microprocessor, which receives and converts said pulse signals, and transmits the pulse signals to said control board, at the same time encodes the output pulse number;

A measuring microprocessor, which receives the output pulse number encoded data from said encoding microprocessor and converts the output pulse decoded data to the output pulse number after the output pulse encoded data is decoded. Said measuring microprocessor directly receives the output pulse signal from said encoding microprocessor to count or said measuring microprocessor receives counted number from other components on said control main board which counting the output pulse signal of the encoding microprocessor; said measuring microprocessor will compare the decoded pulse number and the directly received pulse number to determine if there are suspecting frauds in the fueling process.

Said Pulse signal generating component are there two kinds of: photoelectric and electromagnetic. Said photoelectric pulse signal generating component comprises an optical grating encoder, which is installed on the spindle that connected to the flow measuring transducer and rotates with. The rotating circle number of the optical grating encoder is proportional to the flow volume. Said electromagnetic pulse signal generating component includes a magnetic steel body, as the magnetic field generating component, which is installed on the spindle that connected to the flow measuring transducer and rotates with. The rotating circle number of the magnetic field generator part is proportional to the flow volume Preferably, said electromagnetic pulse signal generating component includes a programmable magnetic rotary encoding chip, which inducts the magnetic field distribution of said magnetic steel body to transmit two circuit output pulse signals after it is processed and converted.

Preferably, the material of said magnetic field generating component is AlNiCo, SmCo5 or NdFeB magnetic steel body, which is installed on the spindle that connected to the flow measuring transducer and rotates with. The rotating circle number of the magnetic field generating component is proportional to the flow volume.

Preferably, said security pulse generator comprises a pulse output interface also, which is connected to the output ports designed from said encoding microprocessor respectively and to the pulse input ports of the measuring control main board. The pulse signal of the measuring control main board is inputted into said measuring microprocessor finally.

Preferably, said measuring microprocessor is connected to said encoding microprocessor by said UART (Universal Asynchronous Receiver/Transmitter) interface module.

Preferably, it also comprises a memory, which is connected to said measuring microprocessor to store said pulse output data, oil amount data and suspecting frauds abnormal for fueling records each time.

At the same time, this invention provides a method to determine fuel dispenser fraud, which is achieved by said security pulse generator for fuel dispensers. The steps comprising:

Step a: While the fuel dispenser is fueling, the flow measuring transducer enables said pulse signal generating component to generate the pulse signal corresponding to the fuel amount.

Step b: said encoding microprocessor received said pulse signal,

Step c: Said encoding microprocessor transforms said pulse signal into the pulse formats that required by the control main board and other pulse count components of said measuring microprocessor or control main board receives said pulse signal.

Step d: While said fuel dispenser stops fueling, said pulse signal generating component stops generating the pulse signal.

Step e: The measuring microprocessor gets the pulse count number of the control main board; wherein if the measuring microprocessor on the control main board does not count the pulse number, the pulse signal count number component on said control main board would accumulate the pulse count number and send the accumulated pulse count number to said measuring microprocessor as the pulse count number of the control main board; if said measuring microprocessor directly counts and accumulates the pulse number, the accumulated pulse count number would be as the pulse count number of the control main board, and the oil amount data would be generated by the pulse count number of the control main board.

Step f: Said encoding microprocessor encoding the accumulated pulse number and transmitting the accumulated pulse encoded count number to said measuring microprocessor by which it is decoded and converted to the corresponding output pulse count number.

Step g: The measuring microprocessor calculates the relative different value of the pulse data of said control main board in step e and said output pulse data in step f, and compares it to a setting threshold. If it is less than said setting threshold, step h would be executed. If it is more than said setting threshold, Step i would be executed.

Step h: To determine that there is no fraud behavior.

Step i: To determine that there is suspecting fraud behavior.

Preferably, before said Step a it including:

Step a': when the fuel dispenser engendering the fueling actions, the two-way verification should be executed between said encoding microprocessor and said measuring microprocessor.

Step a": to determine whether the verification is successful or not, if it is successful, said Steps a should be executed, otherwise said Steps i should be executed.

Preferably, between said Step d and Step e further including:

Step d': the two-way verification should be executed between said encoding microprocessor and said measuring microprocessor, Step d": to determine whether the verification is successful or not, if it is successful, said Steps e. should be executed, otherwise said Steps i should be executed.

Preferably, after step i, further including: Step j: the output pulse number for each time as well as suspecting fraud abnormal fueling records should be stored.

Preferably, when the abnormal fueling number of said suspecting frauds reaches a certain setting value, said measuring microprocessor takes the locking machine operation for said fuel dispenser.

Compared with existing technologies, the beneficial effect of this invention is that, first of all, the fuel dispenser's fraud and leakage behaviors could be prevented effectively for comparing the pulse numbers counted by the encoding microprocessor in the security pulse generator and from the measuring microprocessor.

Secondly, the method of magnetic encoding was applied to make its size smaller, more accuracy and stability, but also to overcome the dependence on the environment, such as oil and gas environment;

Finally, multiple operating and output modes could meet the needs of a variety of scenarios.

DETAILED DESCRIPTION OF THE EMBODIMENTS

With the attachment Drawings, the more detail description above, other features and advantages of the technology about this invention comprise.

Figure 1:
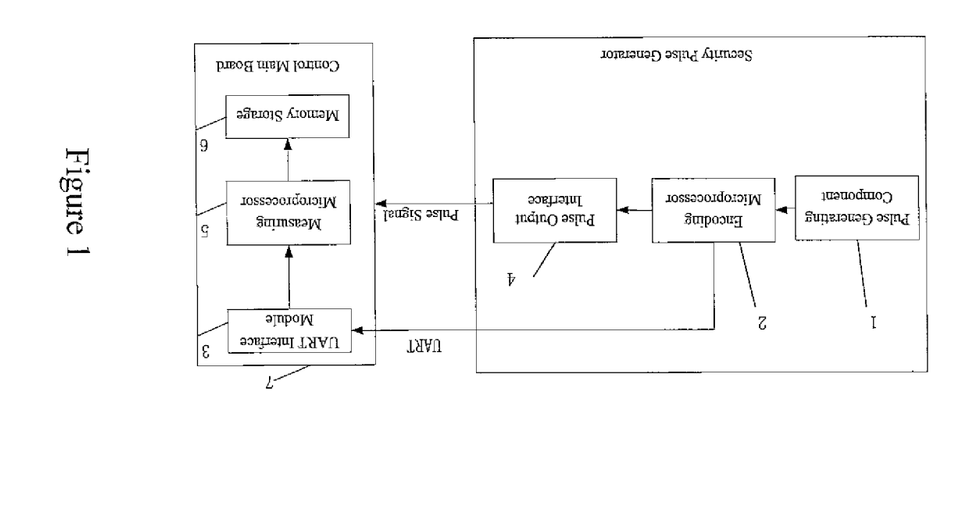
FIG. 1 is a modular architecture schematic diagram of a preferred embodiment of a security pulse generator for the fuel dispensers according to this invention.

Please refer to FIG. 1 shown, which is the modular architecture schematic diagram of the preferred embodiment of a security pulse generator for the fuel dispensers for this invention, this invention is applied in the fuel dispensers, wherein said fuel dispenser comprises a flow measuring transducer and a control main board 7 which comprising a measuring microprocessor 5, said security pulse generator for the fuel dispensers comprising:

a pulse generating component 1, which generates the corresponding pulse signal according to the rotation of said flow measuring transducer.

Said pulse signal generating component 1 may be either photoelectric or electromagnetic one. For the photoelectric pulse signal generating component, its optical grating encoder is installed on the spindle that the flow measuring transducer connected to and rotates with, of which the rotating circle number is proportional to the flow volume. For the electromagnetic pulse signal generating component, the magnetic field generating component is a magnetic steel body, of which the material is AlNiCo, SmCo5 or NdFeB, which is installed on the spindle that the flow measuring transducer connected to and rotates with, of which the rotating circle number is also proportional to the flow volume.

Said encoding microprocessor 2, which receives and transduces the pulse signal, and finally transmits it to the control main board 7, at the same time, said encoding microprocessor 2 records the transduced pulse data and encode said pulse data; a pulse output interface 4 is connected to respectively the output ports designed by said encoding microprocessor 2 and the control main board 7 of the fuel dispenser by cable.

Said measuring microprocessor 5 receiving the pulse encoded data through the UART (Universal Asynchronous Receiver/Transmitter) interface 3 from the encoding microprocessor 2, and decoding the pulse encoded data, comparing it to the pulse number received and counted by the control main board to determine if there are suspecting frauds in the fueling process. Preferably, it also including a memory 6, which is connected to said measuring microprocessor 5 to store the output pulse data, oil amount data and suspecting fraud records for fueling each time. Said memory 6 can be set on the control main board or on the security pulse generator for the fuel dispensers also.

Figure 2A:
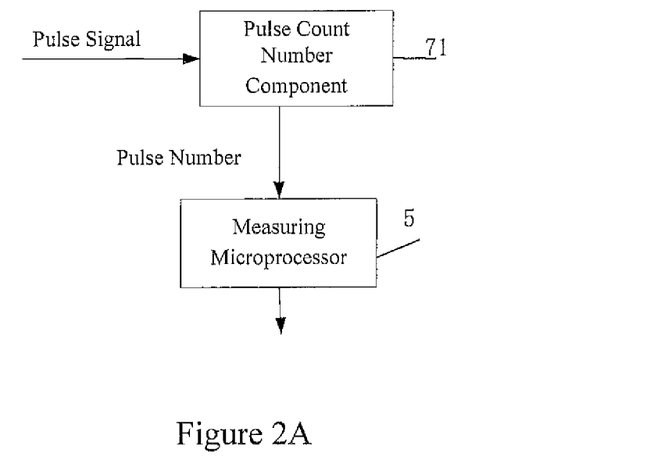
FIG. 2A is an architecture schematic diagram that a measuring microprocessor on the control main board receives the pulse signal of a security pulse generator for the fuel dispensers by the pulse count number component according to this invention.
Figure 2B:
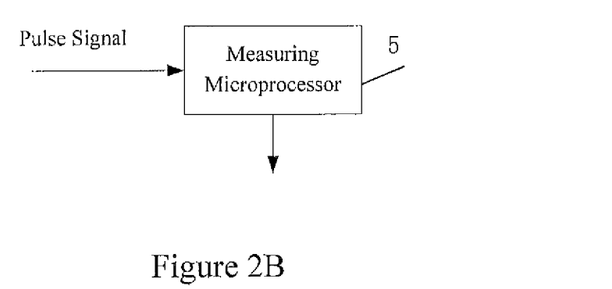
FIG. 2B is an architecture schematic diagram that a measuring microprocessor on the control main board directly receives the pulse signal of a security pulse generator for the fuel dispensers according to this invention.

Please refer to FIG. 2A, 2B, which are the architecture schematic diagram that the control main board receives the pulse signal in the security pulse generator for the fuel dispensers for this invention, there are two ways. First as shown in FIG. 2A, the pulse signals sent out from the encoding microprocessor 2 are inputted to the pulse count number component 71 on the control main board; after counting the pulse signals by the pulse count number component, which are provided to the measuring microprocessor 5 as the pulse number of the control main board; Second as shown in the FIG. 2B, the pulse signals from the encoding microprocessor 2 are directly fed in the measuring microprocessor 5. The pulse signals are acquired and counted by the measuring microprocessor 5 as the pulse number of the control main board.

Figure 3A:
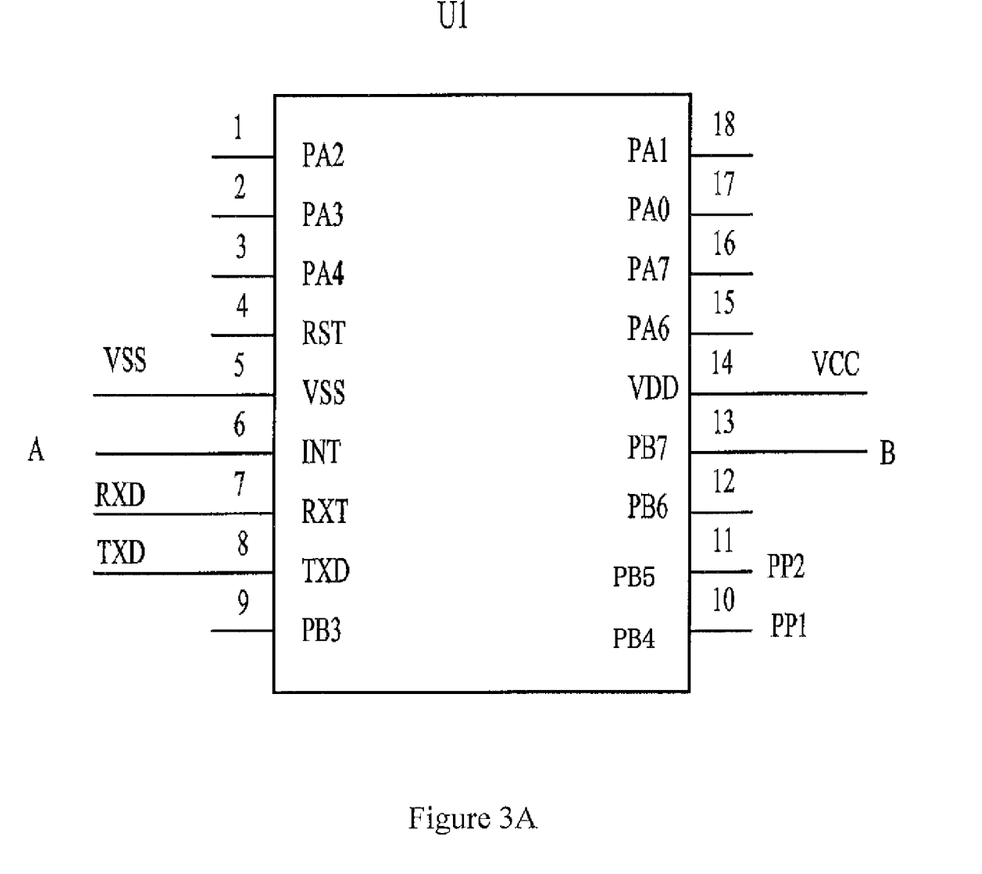
FIG. 3A is a diagram of an embodiment of the encoding microprocessor of a security pulse generator for the fuel dispensers according to this invention.

Please refer to FIG. 3A, which is the diagram of the encoding microprocessor of a security pulse generator for the fuel dispensers for this invention; for example, the encoding microprocessor could be implemented by the Single-Chip Microcomputer. Said encoding microprocessor 2 has built-in memory and reset circuit, of which port INT and PB7 are connected to two output ports A and B of the pulse signal generating component.

Figure 3B:
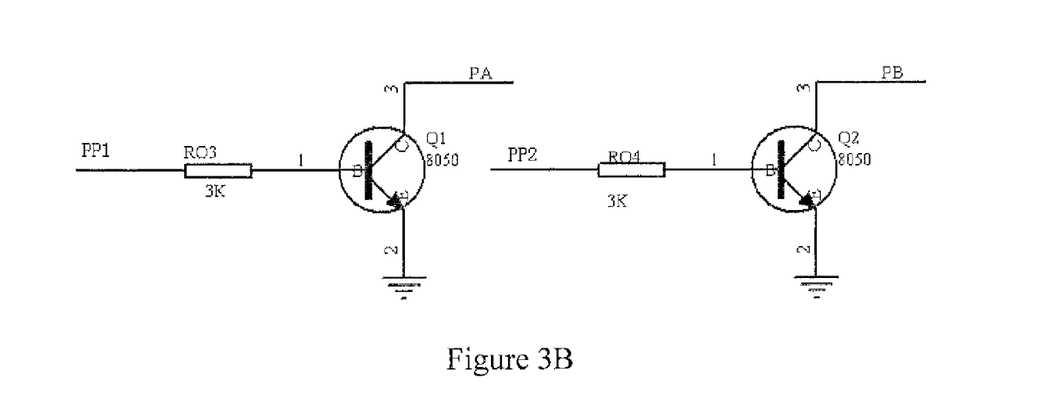
FIG. 3B is an architecture diagram of an embodiment of the pulse output interface of a security pulse generator for the fuel dispensers according to this invention.

Please refer to FIG. 3B, which is the architecture diagram of an embodiment the pulse output interface of the security pulse generator for the fuel dispensers for this invention, said pulse output interface 4 consists of two 8050 transistors in the figure. The base Ds of two 8050 transistors are respectively connected to two output ports of said encoding microprocessor through resistances RO3 and RO4 (that is ports PB4 and port PB5 of the encoding microprocessor in FIG. 3A).

Figure 3C:
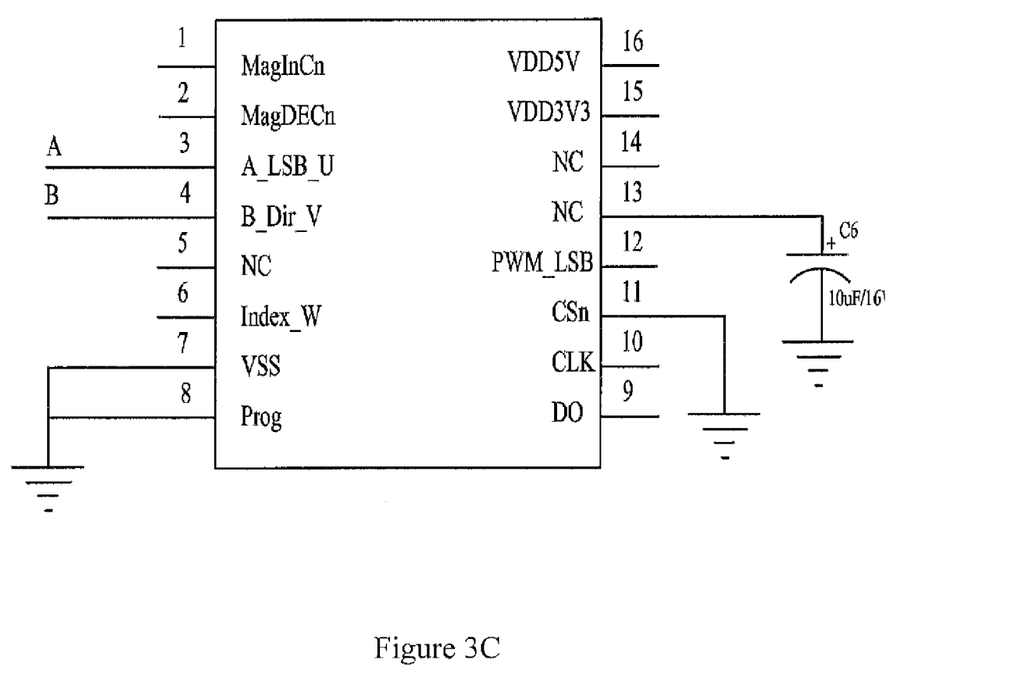
FIG. 3C is a diagram of an embodiment of the programmable magnetic rotary encoder chip of a security pulse generator for the fuel dispensers according to this invention.

Please refer to FIG. 3C, which is the diagram of an embodiment of the programmable magnetic rotary encoder chip of the security pulse generator for the fuel dispensers for this invention, for example, it could be implemented by AS5040, the rotary magnetic encoder IC chip; it is applied in the pulse generating component 1 in the electromagnetic style. Said programmable magnetic rotary encoder chip is installed on the circuit board above the magnetic steel body (magnet), of which the surface inducts the magnetic field distribution for the magnetic steel body (magnet) rotation, which calculates the angle and size of Hall signal by the built-in A/D transducer and the digital signal processing calculation method, and outputs the corresponding signal from the output pin A_LSB_U and B_Dir_V according to the setting of customers. When two path integral A/B output mode are set, a fixed number of output pulse signals would be respectively outputted from pin A_LSB_U (pulse output port A) and pin B_Dir_V (pulse output port B) for rotating per turn of the flow transducer. The phase difference between two paths is 90-degree. For the clockwise rotation, the phase of pulse A is ahead of pulse B. On the contrary, the phase of pulse B is ahead of pulse A by 90-degree.

Thereinafter the description of the work processing of the security pulse generator for the fuel dispensers of the invention is described as follows:

The flow measuring converter rotation makes the pulse generating component 1 to generate two path pulses A, B, which are sent out to the encoding microprocessor 2. The encoding microprocessor 2 analyzes the acquired pulse signal and transits the two path pulse signals to the form that the control main board requiring, then sends out them to the acquisition port of the control main board 7 from the output pins PP1 and PP2 through the pulse output 4. The control main board directly counting the pulses by the measuring microprocessor 5 as the pulse number of the control main board; the pulse count number component 71 on the control main board can also counting the pulses. After transmitting the counted pulse number to the measuring microprocessor 5 by the pulse count number component 71, the measuring microprocessor 5 applies it as the counted pulse number of the control main board.

At the same time, the encoding microprocessor 2 counting and processing the pulse signals, and transforming the accumulated pulse number to the designated form data, and encoding it in the special encoded technology, and transmitting it in a security protocol to the measuring microprocessor 5 through the UART (Universal Asynchronous Receiver/Transmitter) interface.

The measuring microprocessor 5 decoding the encoded pulse data under the security protocol, and comparing it to the counted pulse data of the control main board, and then determining the fuel dispenser behaviors. If determining that there is fraud behavior, the corresponding alarm or mandatory locking machine would be started up, and the corresponding fueling record would be stored in case that it's convenient for the technology inspection departments to collect it as the evidences.

In addition to the pulse output function, the encoding microprocessor 2 can coordinate cooperate with the measuring microprocessor 5 to prevent all kinds of fraud behaviors presented in the links of the pulse signal transmission and the main board of the fuel dispenser.

Figure 4:
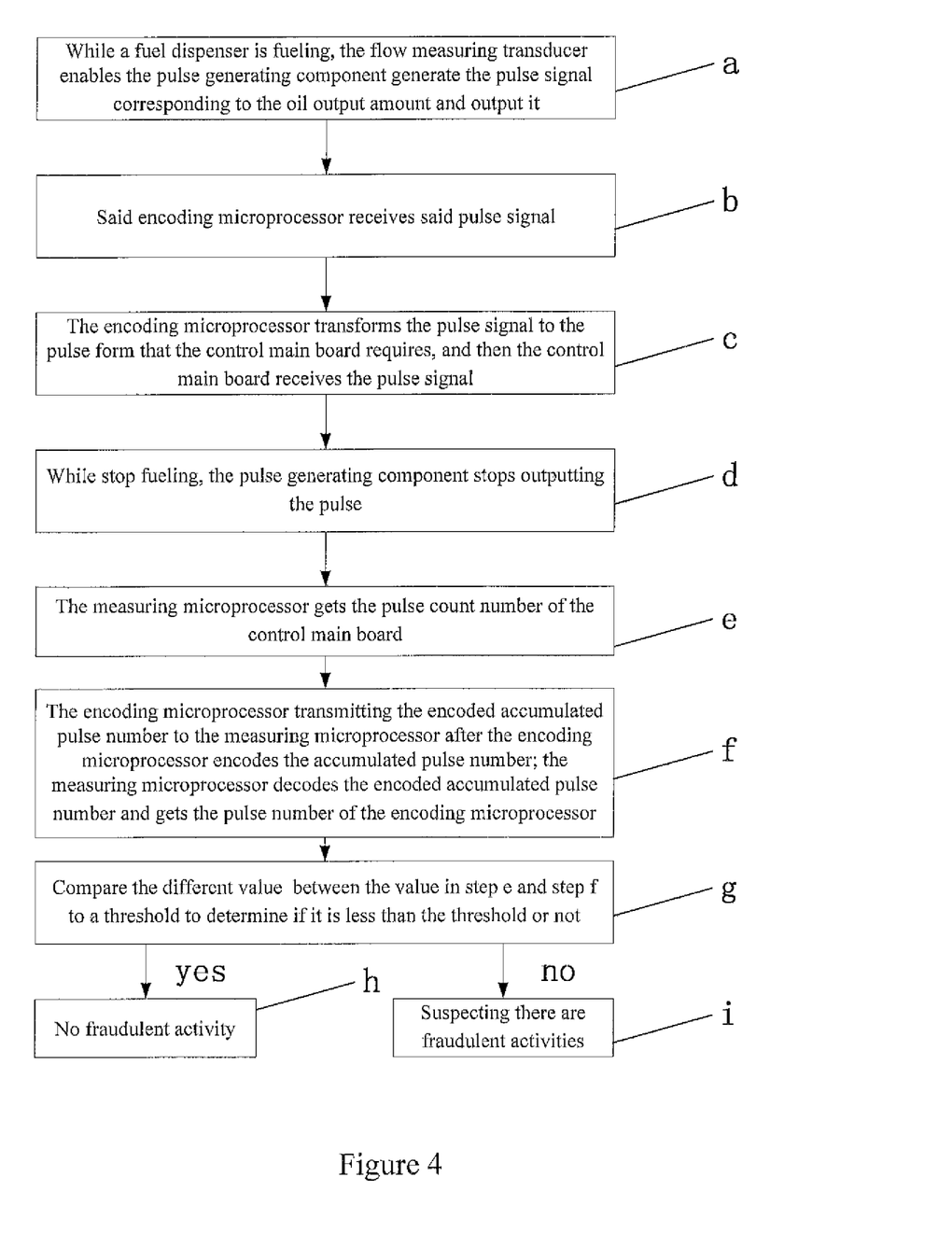
FIG. 4 is a flow chart of the method of determining the frauds of fuel dispensers according to this invention.

Please refer to FIG. 4, which is the flow chart of the method of preventing the frauds of fuel dispensers for this invention. It is implemented by the security pulse generator for the fuel dispensers above, the steps including:

Step a: While the fuel dispenser is fueling, the flow measuring transducer enables said pulse signal generating component 1 to generate and output the pulse signals corresponding to the fuel amount Step b: Said encoding microprocessor 2 receiving said pulse signal.

Step c: said encoding microprocessor 2 transforms said pulse signal into the pulse form required by the control main board 7; said control main board 7 receiving said pulse signal; there are two styles for the control main board 7 to receive the pulse signals: In the first place, the control main board 5 receiving pulse signals directly. In the second place, the pulse count number component 71 on the control main board 7 receiving the pulse signals, and transmitting them to the measuring microprocessor 5 in step e.

Step d: While the fuel dispenser stopping fueling, the pulse signal generating component 1 stopping generating the pulse signal;

Step e: Said measuring microprocessor 5 getting the pulse number of the control main board 7; if the measuring microprocessor on the control main board does not count the pulses, the pulse count number component on said control main board accumulating the pulse count number and transmitting the accumulated pulse count number to said measuring microprocessor as the pulse count number of the control main board; if said measuring microprocessor directly counting and accumulating the pulses, the accumulated pulse count number would be as the pulse number of the control main board, and the oil amount data would be generated according to the pulse count number of the control main board.

Step f: Said encoding microprocessor 2 encodes the accumulated pulse number and transmits the encoded accumulated pulse count number to said measuring microprocessor 5 after it encodes the accumulated pulse count number, and said measuring microprocessor 5 decodes it.

Step g: The measuring microprocessor 5 calculating the relative different value of the output pulse number described in said step e and the output pulse data described in step f, and comparing it to a setting threshold. If it is less than said setting threshold, step h would be executed. If it is more than the set threshold, Step i would be executed.

Step h: To determine there is no fraud behavior;

Step i: To determine there is suspecting fraud behavior. Wherein, preferably, before said Step a there are also:

Step a': When the fuel dispenser engendering the fueling actions, the two-way verification should executed between said encoding microprocessor 2 and said measuring microprocessor 5.

Step a": to determine whether the verification is successful or not, if it is successful, said Steps a. should be executed, otherwise said Steps i. should be executed.

Preferably, between said Step d and Step e including also:

Step d': the two-way verification should executed between said encoding microprocessor 2 and said measuring microprocessor 5.

Step d": to determine whether the verification is successful or not. If it is successful, said Step e. should be executed, otherwise said Step i. should be executed.

Preferably, after step I there is also:

Step j: the pulse number for each time output as well as suspecting fraud abnormal fueling records should be stored.

Wherein, when the abnormal fueling count recorded number of suspected fraud actions reaching a certain number value determined, said measuring microprocessor 5 would take the locking machine operation for said fuel dispenser.

Said encoding microprocessor 2 and said measuring microprocessor 5 built the security transmission channel by the two-way verification. After the two-way verification failed, said measuring microprocessor 5 will prohibit the fuel dispenser fueling, and display an error message. Said two way verification would ensure the only corresponding relationship of the measuring microprocessor 5 and the encoding microprocessor 2, in the meantime, it could avoid any frauds of said measuring microprocessor 5 and said encoding microprocessor 2.

The exception handle process should be executed when there is the suspecting fraud of the amount of fueling oil in said measuring microprocessor 5 for there are any frauds by modifying the pulse equivalent or increasing the pulse number described above; if the abnormal fueling count accumulated number of suspected fraud actions reaching a certain designed value determined, said measuring microprocessor 5 would take the locking machine operation for the fuel dispenser, and this fuel dispenser is not allowed to fuel; at the same time, the abnormal fueling information of suspecting frauds of the fuel dispenser should be record and stored in the memory 6.

When the frauds for the foregoing existing anti-replacing the control main board 7 happening upon customers, said encoding microprocessor 2 would handle the fueling according to the replaced new control main board. After replacing the control main board 7 of the fuel dispenser, said encoding microprocessor 2 would allow the fuel dispenser to fuel for a designated times. More than the designed times mentioned, said encoding microprocessor 2 will cut off the pulse, prohibit fueling, and the fuel dispenser should be unlocked to continue refueling.

There are unlocking issues for the locked fuel dispensers for the anti-fraud. The fuel dispensers once will not continue fueling for after they are suspected for perpetrating the frauds upon the customers. At this point, there is need to be unlocked for anti-fraud. There are two ways to unlock: first to unlock them by a dedicated hand-held device, and the second, to input the administrator password on the keyboard of the fuel dispenser to unlock. The anti-fraud unlock function of the fuel dispenser being a function to manage the fuel dispensers. The two unlock methods are opted to apply for the management department according to the requirements of the gas station management.

While anti-fraud unlocking the fuel dispenser, said memory 6 kept the detail records of suspecting fraud abnormal fueling for each time including the deviation fueling amount, fueling data, dates and so on. This information is stored in a ciphertext and not be modified, but could be read by the keyboard of the fuel dispensers or special handheld devices.

The present embodiments mentioned above are only the preferred implementation cases of this invention. It is considered in all respects as illustrative and not restrictive. It's appreciated for the ordinary skilled person in art that in the define spirit and scope of the claims of this invention, many changes, amendments, even equivalents can be done, but they all will be fall in the protective scope of this invention.

What is claimed is:

1. A security pulse generator being applied in a fuel dispenser having a flow measuring transducer and a control main board, on which there is a measuring microprocessor, said security pulse generator comprising:

a pulse signal generating component, which is applied to generate a corresponding pulse signal according to rotation of the flow measuring transducer;

an encoding microprocessor, which receives and transduces said pulse signal, and transmits said pulse signal to said control main board, in the meanwhile said encoding microprocessor counts and encodes said pulse signal;

a measuring microprocessor, which receives output pulse number encoded data from said encoding microprocessor and decodes said data to get an output pulse number, wherein, an output pulse signal that said control main board collects and the count encoding microprocessor outputs is directly implemented by the measuring microprocessor or the pulse count number component on said control main board and is transmitted to the measuring microprocessor, said measuring microprocessor comparing the decoded pulse number to the pulse number counted by the control main board to determine if there are suspected frauds in the fueling process;

wherein said pulse signal generating component is a photoelectric or electromagnetic one, and wherein the photoelectric pulse signal generating component comprises an optical grating encoder, which is installed on a spindle that is connected to the flow measuring transducer and rotates therewith, of which the rotating circle number is proportional to flow volume; said electromagnetic pulse signal generating component comprising a magnetic steel body as the magnetic field generating component which is installed on the spindle that is connected to the flow measuring transducer and rotates therewith, of which the rotating circle number is proportional to the flow volume;

wherein said electromagnetic pulse signal generating component further comprises a programmable magnetic rotary encoder chip, which inducts magnetic field distribution of said magnetic steel body to transmit two circuit output pulse signals after the chip is processed.

2. The security pulse generator according to claim 1, wherein material of said magnetic steel body is AlNiCo, SmCo5 or NdFeB.

3. The security pulse generator according to claim 1, further comprising:
- a pulse output interface, which is connected to output ports designed by said encoding microprocessor respectively and to pulse input ports of said control main board, the pulse signal of the control main board is sent to the measuring microprocessor or the pulse count component finally.

4. The security pulse generator according to claim 3, wherein said measuring microprocessor is connected to said encoding microprocessor through the Universal Asynchronous Receiver/Transmitter (UART) interface module.

5. The security pulse generator according to claim 1 further comprising:
- a memory, which is connected to said measuring microprocessor to store the output pulse number, oil amount data and determined suspected frauds abnormal for fueling records in the fueling process each time.

6. The security pulse generator according to claim 1, further comprising:
- a memory, which is connected to said measuring microprocessor to store the output pulse number, oil amount data and determined suspected frauds abnormal for fueling records in the fueling process each time.

7. A method to determine fraud in the fuel dispenser, said fuel dispenser having a flow measuring transducer, a control main board, and a security pulse generator, wherein a measuring microprocessor is on the control main board, the method comprising:
- (a) While fueling, the flow measuring transducer enabling a pulse signal generating component to generate and output a pulse signal corresponding to an oil amount;
- (b) An encoding microprocessor receiving said pulse signal;
- (c) Said encoding microprocessor transforming said pulse signal into a pulse form required by said control main board, said measuring microprocessor or a pulse count number component on said control main board receiving said pulse signals;
- (d) When fueling stops, said pulse signal generating component stopping generation of pulse signals;
- (e) The measuring microprocessor obtaining a pulse count number of the control main board, wherein:
  - if the measuring microprocessor on the control main board does not count the pulse number, the pulse count number component on said control main board accumulating the pulse number and transmitting the accumulated pulse number to said measuring microprocessor as the pulse count number of the control main board;
  - if said measuring microprocessor directly counts and accumulates the pulse number, the accumulated pulse number is the pulse number of the control main board and the output oil amount data is generated by the pulse count number of the control main board;
- (f) Said encoding microprocessor encoding the accumulated pulse number and transmitting the encoded accumulated pulse count number to said measuring microprocessor by which it is decoded and converted to the corresponding output pulse number;
- (g) The measuring microprocessor calculating the relative different value of the pulse data of said control main board in step (e) and said output pulse data in step (f), and compares it to a setting threshold wherein
  - if it is less than said setting threshold, step (h) is executed,
  - if it is more than the set threshold, step (i) is executed;
- (h) determining that there is no fraud behavior;
- (i) determining that there is suspected fraud behavior.

8. The method according to claim 7, further including before step (a):
- (a') When the fuel dispenser engendering the fueling actions, executing two-way verification between said encoding microprocessor and said measuring microprocessor;
- (a") determining whether the verification is successful, and if it is successful, said step (a) is executed, otherwise step (i) is executed.

9. The method according to claim 8, further including between steps (d) and (e):
- (d') executing two-way verification between said encoding microprocessor and said measuring microprocessor;
- (d") determining whether the verification is successful or not, and if it is successful, said step (e) is executed, otherwise said step (i) is executed.

10. The method according to claim 9, further including:
- (j) storing the output pulse number for each time fueling and determined suspecting fraud abnormal fueling records.

11. The method according to claim 10, wherein when the abnormal fueling count number of suspecting fraud actions reach a certain setting value, said measuring microprocessor performing a locking machine operation for said fuel dispenser.

12. The method according to claim 7, further including between steps (d) and (e):
- (d') executing two-way verification between said encoding microprocessor and said measuring microprocessor;
- (d") determining whether the verification is successful or not, and if it is successful, said step (e) is executed, otherwise said step (i) is executed.

13. The method according to claim 12, further including:
- (j) storing the output pulse number for each time fueling and determined suspecting fraud abnormal fueling records.

14. The method according to claim 13, wherein when the abnormal fueling count number of suspecting fraud actions reach a certain setting value, said measuring microprocessor performing a locking machine operation for said fuel dispenser.

* * * * *